United States Patent [19]

DiNicola et al.

[11] 4,228,481
[45] Oct. 14, 1980

[54] CAPACITOR WITH EMBOSSED FOIL ELECTRODE

[75] Inventors: Nicola G. DiNicola; Robert V. Pastir; William J. Wright, all of Glen Falls, N.Y.

[73] Assignee: General Electric Company, Hudson Falls, N.Y.

[21] Appl. No.: 952,947

[22] Filed: Oct. 19, 1978

[51] Int. Cl.³ .................... H01G 0/15; H01G 4/22
[52] U.S. Cl. ........................... 361/314; 361/303; 428/604
[58] Field of Search ............ 361/303, 314, 315; 428/603, 604

[56] References Cited

U.S. PATENT DOCUMENTS

| | | | |
|---|---|---|---|
| 662,567 | 11/1900 | Lipowska | 428/604 |
| 1,532,846 | 4/1925 | Thordarson | 361/303 |
| 2,951,305 | 9/1960 | Seymour | |
| 2,976,567 | 3/1961 | Jones | |
| 3,077,514 | 2/1963 | Kang | |
| 3,105,872 | 10/1963 | Thompson | |
| 3,190,412 | 6/1965 | Rutter | 428/604 |
| 3,585,467 | 6/1971 | Linzey | |
| 3,746,953 | 7/1973 | Lapp | |
| 3,761,772 | 9/1973 | Suzuki | |
| 3,900,774 | 8/1975 | Dijima | |

FOREIGN PATENT DOCUMENTS 106535 2/1939 Australia .
623731 7/1961 Canada .
1251839 11/1971 United Kingdom .

OTHER PUBLICATIONS

Petley "The Impregnation of Plastic Film Capacitors".

Primary Examiner—E. A. Goldberg
Attorney, Agent, or Firm—J. J. Lichiello

[57] ABSTRACT

An improved power capacitor dielectric system utilizes the combination of electrode foils having a raised dimple pattern on their surfaces, and only polypropylene film as the dielectric, the polypropylene film having a texture pattern on one surface.

10 Claims, 11 Drawing Figures

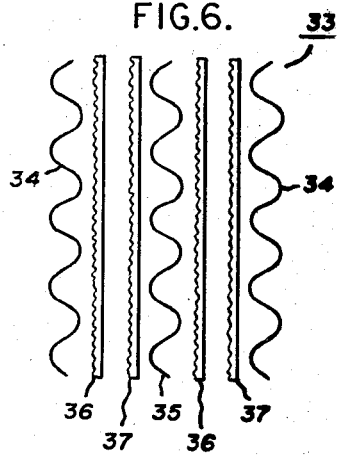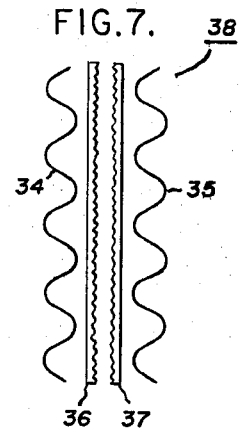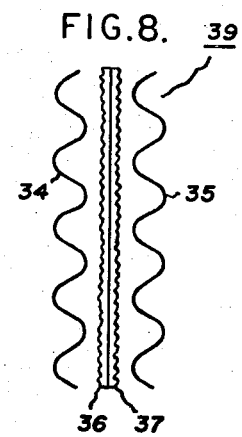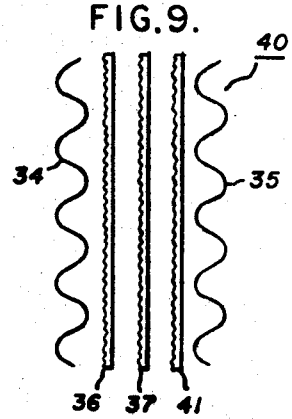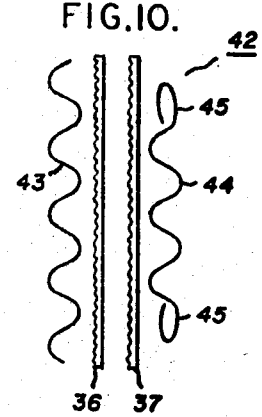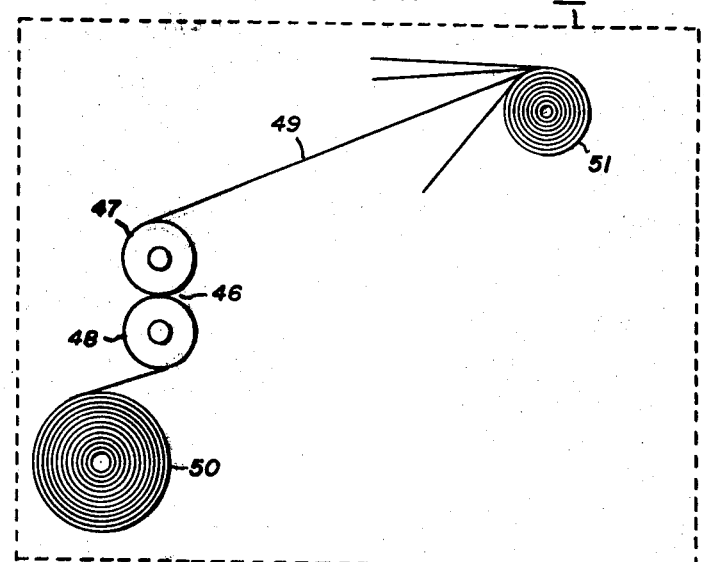

CAPACITOR WITH EMBOSSED FOIL ELECTRODE

This invention relates to an improved capacitor and more particularly to a dielectric fluid filled capacitor wherein solid synthetic resin dielectric strips and foil electrode strips have mutually complementary roughened and patterned interface surfaces to stabilize their spaced relationship and to facilitate fluid penetration therebetween.

BACKGROUND OF THE INVENTION

Fluid impregnated capacitors made up of alternating electrode foil and synthetic resin film strips wound in a tight roll form have been difficult to impregnate with dielectric fluids because although a capacitor roll is wound with a certain degree of looseness, defined as space factor, the fluid must not only penetrate into the roll from the ends thereof, but must also penetrate the interfaces between film strips which stick together, and between film and foil strips which also stick together. In order to overcome this well known and common problem, a number of solutions have been proposed which relate to complex impregnation cycles and roughening of the foil and/or film surfaces by various surface disfiguration methods, including mechanical and chemical processes such as foil embossing, abrading, and coating, and film etching.

The problems associated with these solutions have been numerous, ranging from poor overall fluid impregnation and electrical test results, undesirable increase of thickness of the capacitor roll without correlation to the required space factor of the capacitor, and poor economics because of the additional processing required. More importantly the reliability and repeatability of acceptable electrical tests for capacitors produced from the usual manufacturing processes have been deleteriously affected by these prior solutions.

THE INVENTION

It has been discovered that the foregoing problems may be overcome or minimized by the winding together, in roll form, a special unique surface polypropylene film denoted "Hazy" film (TM General Electric Company) and a specially patterned metal electrode foil surface. This combination, when used with preferred fluids facilitates fluid impregnation of a roll to provide an improved, more stable capacitor of uniform space factor wherein a synthetic resin film such as polypropylene film is the sole dielectric between foil electrodes.

THE DRAWINGS

This invention will be better understood when taken in connection with the following description and drawings in which:

FIG. 6 is an exaggerated illustration of the use of pattern electrode foil and Hazy film in smooth to rough relationship as the sole dielectric in a capacitor.

FIG. 7 is an illustration of a modification of the embodiment of FIG. 6 showing the use of two Hazy film strips in rough to rough surface relationship.

FIG. 8 is an illustration of a modification of the embodiment of FIG. 7 showing the use of two Hazy film strips in smooth to smooth or head to head relationship.

FIG. 9 is an illustration of a modification of FIG. 6 showing the use of three Hazy film strips in smooth to rough relationship.

FIG. 10 is an illustration of a folded foil modification of the embodiment of FIG. 6.

FIG. 11 is a schematic illustration of a pair of electrode foil embossing rolls mounted on a capacitor roll winding machine.

DESCRIPTION OF THE INVENTION

Figure 1:
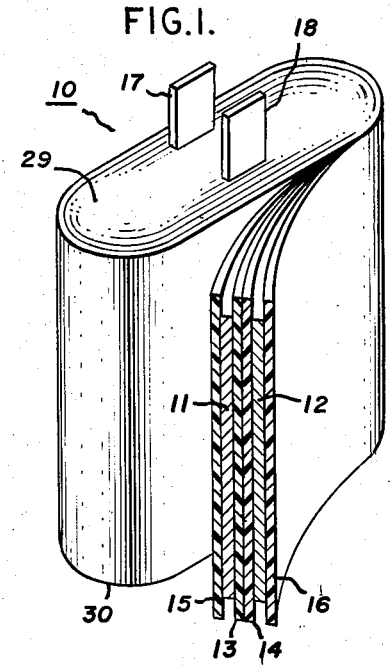
FIG. 1 is an exaggerated illustration of a capacitor roll in partly unrolled form to show dielectric film and electrode foil relationships.

Referring now to FIG. 1 there is illustrated a capacitor roll 10 in a partly unrolled form. Roll 10 includes a pair of spaced metal foil strip electrodes 11 and 12 and intermediate polypropylene film strips 13 and 14. Additional polypropylene film strips 15 and 16 complete the roll so that pairs of polpypropylene film strips are found between metal foil electrode strips throughout the roll. Tap straps 17 and 18 are inserted into the roll 10 to lie adjacent the electrode strips to serve as electrical connections for the electrodes.

Figure 2:
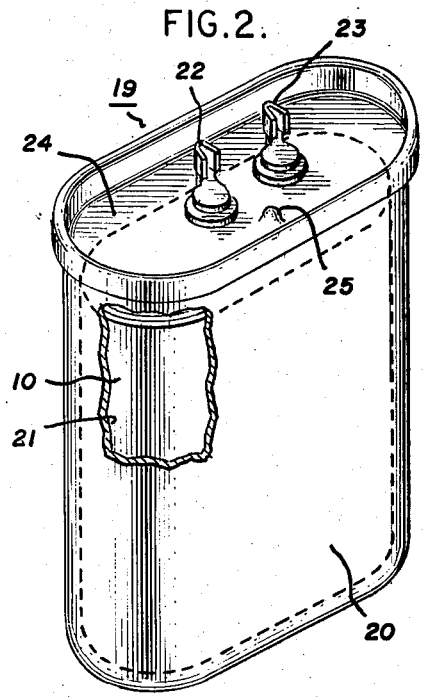
FIG. 2 is an illustration of an electrical cpacitor assembly utilizing a single capacitor roll of FIG. 1.

One or more capacitor rolls 10 are inserted into an appropriate casing, the casing is filled with a dielectric fluid and the fluid is caused to penetrate and permeate the roll to fill up the spaces between the windings of the roll as well as into the polypropylene material itself. One such capacitor 19 is shown in FIG. 2 wherein a single roll 10 is included in a can or casing 20 filled with dielectric fluid 21 (not shown). Can 20 includes a pair of electrical terminals 22 and 23 to which taps 17 and 18 are connected. Cover 24, which is sealed to can 20, includes a small aperture (not shown) which is used to introduce fluid into the can 20 and is thereafter solder sealed as depicted by the solder 25.

Figure 3:
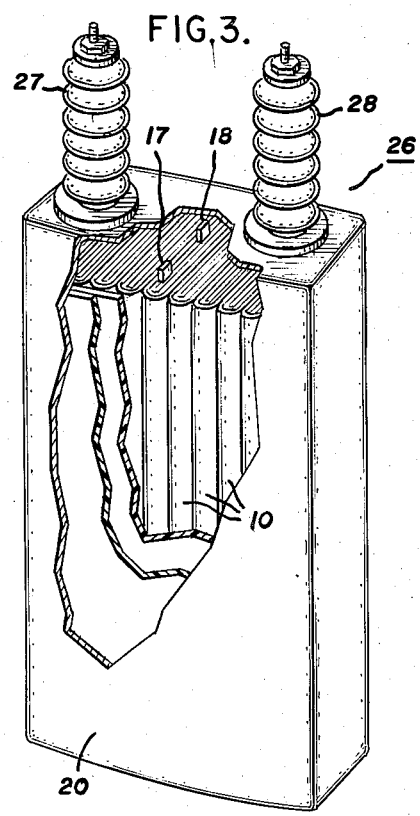
FIG. 3 is an illustration of a high voltage power factor correction capacitor assembly utilizing a plurality of the capacitor rolls as shown in FIG. 1.

Another capacitor denoted a power capacitor 26 is illustrated in FIG. 3. In FIG. 3 capacitor 26 includes a plurality of rolls 10 which are arranged in an upper and lower row, as a two pack design, all of which are immersed in fluid 21. Casing 20 may exceed 65.0 cm in height, and the rolls 10 may be from about 10 inches (25.4 cm) to 12 inches (30.5 cm) in length. Rolls 10 also include taps 17 and 18 which are joined together electrically and to terminals 27 and 28. Where a single pack design is utilized, the rolls are referred to as wide rolls and may be about 60 cm or greater in length. Taps 17 and 18 may be eliminated by use of an exposed foil construction where each electrode foil projects from a respective end of the roll. The foil windings at each end are soldered together and then a connection is made to terminals 27 and 28. Because of the tightness of the windings of rolls 10 and the fact that the metal foil strip electrodes constitute essentially an impermeable lateral barrier, the fluid must enter through the roll ends 29 (FIG. 3) and 30 (FIG. 1). At this point, because of the elevated temperatures used in vacuum drying of the rolls as well as in the impregnation process, the overlapping polypropylene film strip edges at the roll ends tend to seal together as well as seal the electrode strips and swell tightly with adjacent strips when absorbing fluid, thus hindering the penetration of the fluid into the roll. In the present invention the combination of Hazy polypropylene film strips and patterned metal foil strips provides a controlled permeable spacer means and fluid penetration paths into the rolls 10 from the roll ends in a unique and economical manner. Hazy film is the subject of a U.S. patent application, Ser. No. 686,832 assigned to the same assignee as the present invention.

As best described, Hazy film comprises polypropylene film obtained from a blown tube manufacturing process where temperatures and speeds are controlled in such a manner that a polypropylene stalk or tube emanating from an extruder has on its outer surface a continuous and coextensive uniform layer of predominately type III crystal structures, often referred to as $\beta$ crystals. Subsequent insufflation of the stalk into a bubble form results in surface discontinuities or craters sometimes defined as surface fibrils extending completely over one surface of the film. These fibrils may extend as much as 2 to 3 microns from the base film thickness. As described, the Hazy film of this invention therefore has one surface quite roughened and the opposite surface may be denoted as smooth or shiny. Roughness may be measured by ASTM test D2457-70 or D10003 although a measurement which considers the open space in a rough surface (space factor) is preferred. This irregular surface texture on the capacitor film strips in rolls 10 provides a space factor in the form of fluid paths between a contiguous foil electrode and a dielectric strip, or between contiguous dielectric strips to facilitate the penetration of fluid. Modified forms of Hazy film may be obtained from other film processes including the draft and tentering process and film casting process. However, within the realm of this invention other surface roughened films may be employed provided their surface roughness and space factor characteristics are reasonably similar to those of Hazy film, although Hazy film is most preferred.

Hazy film has not only a high degree of surface irregularity, but also a highly desirable high space factor. Space factor is a term describing the measured excess space for example between a measured volume of Hazy film strips superimposed on each other as compared with the measured volume of the same strips without any surface roughness. In other words, the roughness desired is related to a maximum peak to valley measurement over fewer peaks and valleys (which would give a high space factor and high impregnability) as compared to a maximum number of peaks and valleys of lesser dimensions which would give a lower space factor. With known film process conditions surface roughness may be empirically correlated to space factor by measuring light transmission through the film, for example, as per ASTM D10003, and the measurement obtained is in terms of haze.

The use of specially patterned foil electrodes, together with Hazy film provides an improved impregnatable capacitor structure. While capacitor electrodes may be foils of various metals, aluminum foil is the principle electrode material presently employed. Ordinarily, these electrodes are about 0.20 to 0.24 mils thickness (5.0 to 6.1 microns) and are soft annealed aluminum. It has been known to roughen the surfaces of aluminum electrodes in capacitor rolls to facilitate fluid impregnation of the roll. U.S. Pat. No. 3,746,953 is an example. Many such roughened electrode foils were found to have serious disadvantages in that the roughening processes formed sharp edges or caused some larger perforations of the foil leading to sharp edges, and sharp edges are areas of high voltage stress and corona discharge in a capacitor. Also these sharp edges cause cutting of the adjacent polypropylene film which weakens the dielectric strength of the film at that point. A further disadvantage is that foils were believed to require a high degree of roughness such as obtained from crimping and knurling processes, and these roughened foils retained an excessive space factor in the roll, or they were non uniform with fixed roughness.

Figure 4:
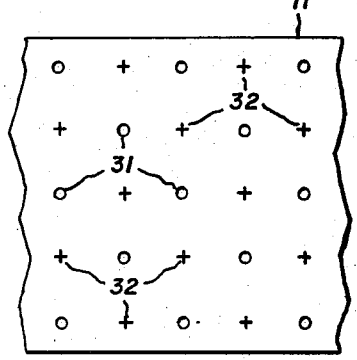
FIG. 4 is a plan view of a section of foil electrode showing a pattern layout of the electrode foil.
Figure 5:
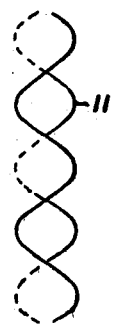
FIG. 5 is a cross sectional view, in line form, of the patterned electrode foil of FIG. 4.

It has been discovered that an improved, uniquely patterned foil minimizes the foregoing impregnation and space factor problems. Such an improved raised pattern foil is illustrated in FIG. 4. Referring now to FIG. 4 there is illustrated a section of a foil strip electrode 11 showing an exaggerated embossed and raised pattern of dimple-like depressions 31 and proturberances 32 thereon. The raised dimple pattern is a pattern projecting equally and oppositely from both sides of the material and from the original thickness of the material so that the overall thickness is significantly greater than the original thickness. The dimple structure is more clearly illustrated in FIG. 5. Referring to FIG. 5 there is illustrated a cross section, in line form, of the foil 11 of FIG. 4. In a preferred form of this invention the dimples have an ovate like cross section and extend about 0.0025 inches (about 63.5 microns) from each side of the center line of the foil strip. Each dimple has a base diameter of about 0.01 inch (about 0.254 microns) and the dimple or base centers are spaced about 0.02 inches apart (about 0.508 microns) as illustrated in FIG. 4. Each dimple may be described in preferred form as having a circular base and progressively decreasing horizontal circular cross sections terminating in a rounded or ovate form. The surfaces defining the dimples are smooth flowing curvilinear surfaces from one dimple, as a protuberance, to the next dimple as a depression. The vertical cross section approximates an electrical sine wave form indicating that there are no sharp corners or interruptions in curvature from the surface of one dimple to another. Other forms of curvilinear bases and cross sections may be employed so long as no sharp corners or ridges are present. The circular form described is preferred. The foil, as described, is referred to as a full dimple pattern foil. By this full dimple pattern, the total capacitor surface of the foil is involved in the pattern and there are no intermediate significantly undeformed areas. The pattern is described as 50/50 or 60/60 indicating that there are 100 or 120 dimples, respectively, for each 1 inch (2.54 cm) of electrode foil. In other words, the curvilinear surfaces are essentially continous over the foil and not interrupted. In this connection the pattern may be extended to 120/120 or greater, as conditions merit.

The full dimple pattern structure of this invention provides a maximum space between adjacent strips of aluminum foil and film dielectric strips with a minimum overall increase in space factor. This feature is attained through the unique structure of the foil. As noted in FIG. 4 the dome structure of the dimples greatly increase the thickness of the aluminum foil from an original thickness of about 0.22 mil (05.5μ) to approximately 1 mil (25.0μ). This is five times the original thickness, a total thickness which if incompressible or fixed could not be effectively utilized in this invention. It is also a condition ordinarily unattainable by means of etching, knurling or abrading an aluminum foil strip. At the same time the mechanical arch structure of dimples provides increasing or controlled resistance to crushing and dimple erasure or leveling when winding the foil under roll tension into a capacitor roll. However it permits a substantial degree of desirable cushioning and leveling in the winding process so that in spite of its original thickness the final capacitor roll is within design tolerances. A range of thickness would be an increase from about 2 to 10 times the original thickness, with a preferred thickness being about 5 times the original thickness. The metal electrode of this invention becomes a variable or flexible thickness spacer in the capacitor roll winding process as well as in the final capacitor. This flexible or variable thickness is correlated to those imposed forces found in a capacitor manufacturing process so that a desired degree of thickness is retained in the final capacitor. When in the roll, because of the smooth curving dimple profiles, there are no perforations or sharp edges which could penetrate the film dielectric, or serve as stress concentration areas.

For the purpose of this invention, the capacitor space factor as set forth in the examples and in the claims is that space factor as measured in a capacitor after full swelling of the polypropylene film by the impregnating fluid. The base measurement for the capacitor space factor is the space factor of the Hazy polypropylene film. The patterned foil is arbitrarily excluded. The space factor of a Hazy polypropylene film is the ratio of the theoretical, solid volume of a film strip as compared to its measured volume including a theoretical planar surface lying along the roughened surface. The ratio is given in percent of the solid volume so that a 10% space factor indicates a volume where the space is 10% of the solid material. The film space factor is then increased by an amount representing the swelling of the film by the fluid used at appropriate treat temperatures. The increased amount is correlated to a probability curve which accommodates the various tolerances in the manufacturing processes and materials, and a final design or capacitor space factor is determined which is larger than the measured film space factor as above described.

Space factor in the capacitors of this invention is critical to accommodate all the differences in dimensional tolerances of the materials and the different temperature coefficients of expansion of the materials, and the swelling of the materials by the fluids. Space factor is necessary prior to fluid impregnation in order to have space available for the removal of water and other volatile materials when the capacitor is vacuum dried at elevated temperatures, as well as to meet the necessity of having space through which the impregnating fluid passes to essentially completely impregnate the capacitor roll.

Space factor should be uniform throughout the roll, i.e., there should be some minimum degree of space factor such as a mean or average space factor throughout the roll, and this space factor should be preserved and controlled throughout the winding process, and in the flattening process to flatten the capacitor as illustrated in FIG. 1. The combination of patterned foil and Hazy film is a means to provide and to adjustably control space factor in the capacitors as described in this invention.

The mere provision of rough adjacent film and foil surfaces to provide space or to form passages for the ingress of fluid is not entirely sufficient for capacitor production. Space alone can be gained in one respect by a more loose winding of the roll. However, by having a more loose winding there is a resulting loss of uniformity of the required space factor in a capacitor and a softer roll, both of which, because of the tension winding process and roll flattening process provide critical areas for capacitor failure.

The amount of space factor which is obtainable from presently available Hazy polypropylene films is generally insufficient to serve as the total space factor requirement in for example, power capacitors, and if available in the film, is expected to be relatively invariable in the capacitor manufacturing process. Furthermore, the roughness on polypropylene film is not entirely uniform and certain areas may have high roughness and other areas may have low roughness. This condition, which is also not necessarily correlated with variances in film and foil thickness, contributes to the problem of attaining a uniform space factor of some satisfactory degree throughout the capacitor roll. The complementary space factor control means is therefore the full dimple pattern foil of this invention whether or not there is a sufficient amount of space factor already present in the polypropylene film strips. The patterned foil serves as an adjustable cushioning means to provide the desired degree of space factor uniformly throughout the roll. The dimple structure requires an ever increasing force for flattening because of its unperforated dome structure and therefore adjusts itself to varying pressures or forces throughout the roll and in the roll winding process to retain the integrity of the design space factor. It is compressibly deformable and area selective over even a single dome, and more importantly, the total capacitor area of the foil is included in pattern.

In the practice of this invention the Hazy film and full dimple pattern foil may be wound into a capacitor roll in various arrangements. One preferred arrangement uses only Hazy film as the dielectric material strips 13 through 16 between the foil electrodes 11 and 12. Such an arrangement is shown in FIG. 6 in an exaggerated manner with the film and foil strips in spaced relation.

Referring now to FIG. 6 the composite 33 comprises a pair of patterned or dimpled foils 34 and 35 and two intermediate Hazy film strips 36 and 37. In the commercial production of aluminum foil one surface is usually quite smooth and shiny and the other surface is referred to as a rough or matte surface. The foil rolling operation involves passing two superimposed foil strips between the rolls and the surface between strips becomes different, i.e., rougher than the surface adjacent the rolls. It has been shown that the matte surface actually improves impregnation because of the additional space factor caused by the matte surface. Consequently, as a further aid to impregnation the aluminum foils are positioned such that the smooth or shiny surface is adjacent the rough surface of the Hazy film. This is referred to as a smooth to rough relationship. Hazy film strips may have the required surface discontinuities or roughness on one or both sides. The Hazy film as described in detail herein has but one surface which is rough. In this latter event when two polypropylene film strips are utilized, they are arranged in what is also referred to as a rough surface to a smooth surface relationship. In this manner each electrode foil strip has a smooth surface which is adjacent a rough surface of a Hazy film strip throughout the roll which facilitates more uniform impregnation of the roll.

A further modification of the embodiment of FIG. 6 is illustrated in FIG. 7. In FIG. 7 the composite 38 comprises a pair of Hazy film strips 36 and 37 which are arranged in rough to rough surface relationship. In this arrangement one or both rough surfaces of the electrode foil strips may be adjacent a smooth film strip surface although it is preferred to have one reversed from the other. The impregnating fluid is caused to permeate the rough surface areas between the film strips and then to proceed laterally through the film strips into the areas between the film strips and the foil strips. Fluid also permeates this area from the roll ends along the electrode foil surfaces.

An additional modification is illustrated in FIG. 8. Referring to FIG. 8 the composite 39 comprises a pair of dimpled electrode foils 34 and 35 separated by a pair of Hazy film strips 36 and 37 which are arranged in smooth to smooth surface relationship. In this modification the arrangement of the smooth and rough electrode foil strip surfaces is relatively unimportant although it is preferred to have one reversed with respect to the other.

A further modification is illustrated in FIG. 9. Referring now to FIG. 9, the composite 40 comprises a pair of dimpled foils 34 and 35 separated by three Hazy film strips 36, 37 and 41. The film strips are all arranged in smooth to rough relationship as a preferred embodiment although there could be a mix of relationships. The electrode foil strips are arranged with a smooth foil surface adjacent a rough surface of a film strip. The use of three film strips of FIG. 9 instead of two film strips of FIG. 6 may provide an additional advantage of a higher dielectric strength capacitor. Obviously more than three film strips may be employed as well as a single film strip.

In some cases, and in any of the described embodiments, it may be desirable to fold over one edge of a foil electrode strip because of increased stress at the foil edge. Electrode foil edges are usually referred to as sharp edged, a condition obtained when the foils are slit to a given width. This slitting is usually accomplished with a knife edge and the resultant electrode foil edge is sharp and sometimes irregular because of burr like projections which become the sites for the commencement of corona. As can be seen in FIG. 6, a high voltage stress field is set up between electrode foil strips 34 and 35 at the roll ends 29 and 30, and any sharp edges or other discontinuities cause or support corona inception. These areas are more susceptible to corona discharge when lower dielectric constant fluids are used, e.g., fluids having a dielectric constant in the range of 2.0 to 3.0 as compared to fluids having a dielectric constant in the range of 2.0 to 3.0 as compared to fluids having a dielectric constant above about 3.0 such as the chlorinated diphenyls and esters, because the fluids are under higher stresses in these areas. FIG. 10 represents an embodiment which minimizes these high stress effects.

Referring now to FIG. 10, the composite 42 comprises a wider electrode strip 43 and a narrower electrode foil strip 44 which are positioned in opposed axial relationship to each other, and the electrode foils are sometimes referred to as an upper electrode foil 43 and a lower electrode foil 44. In such an arrangement the measured distance between the opposed electrode foil edges is increased. However, it is known that a narrower electrode causes a higher voltage stress in the area of the narrower electrode edge. As illustrated in FIG. 10, this narrower electrode foil 44 has a folded edge 45 running throughout the roll. This folded edge 45 presents a smooth rounded surface to the high stress area and reduces the field stress at the rounded surface. In addition the folded edge reduces the fluid film between the rolled edge and the adjacent polypropylene film strip, and accordingly reduces the likelihood of breakdown of lower dielectric constant fluid in this area.

When folding an electrode foil at its edges it is important that the foil electrode also be folded at its beginning edge width and its terminating edge width or other means be employed to reduce the stress at those locations. A folded edge between about 0.125 inch (0.3175 cm) and 0.5 inch (0.127 cm) will provide satisfactory results, and a range between 0.25 inch (0.635 cm) and 0.375 inch (0.95 cm) is preferred. An additional degree of space factor may be used to accommodate the folded edge. Best results are attained in this invention, with or without a folded electrode foil, when the final space factor is equal to or greater than an amount which will permit total and unrestricted swelling of the polypropylene film by the fluid in the capacitor. In the usual case polypropylene films as described will swell in capacitors such as those in the following example, in the range of about 10 to 18% by volume when using the noted fluids. It is important that ingress and egress of a fluid in a capacitor, or in the polypropylene film, or in the intervening spaced not be restricted by a limitation of film swelling.

Many capacitor fluids may be effectively employed in this invention. Included are esters, hydrocarbons, and synthetic fluids such as the alkanes and biphenyls. The dielectric constant of these fluids may vary from about 2.5 to greater than about 5. The stress on the dielectric system is shared in proportion to the dielectric constants of the materials. Higher dielectric constant fluids shift more stress to the film. With a dielectric constant of polypropylene film of about 2.5, the lower dielectric constant fluids will be more highly stressed, and corona conditions at the roll edges may be worsened.

Included among these fluids are alkyl benzene, alkyl naphthalene, alkyl biphenyl, alkyl polyphenyl, alkylaryl ethers and alkyl substituted derivatives thereof, diaryl alkanes and alkyl substituted derivatives thereof, and diaryl ethers and alkyl substituted derivatives thereof, wherein said alkyl groups and alkanes have from 1 to about 20 carbon atoms, said aryl radicals are phenyl, napthyl, biphenyl, or polyphenyl, and said polyphenyls include from 3 to about 5 phenyl groups. One fluid employed in this invention is diaryl alkane (phenyl zylyl ethane) commercially available as Nisseki Condenser oil S (PXE) from Nippon Oil Company, Japan.

Another specific fluid is monoisopropyl biphenyl (MIPB) which is a carefully blended mixture of the meta and para substituted biphenyl derivatives. MIPB is represented by

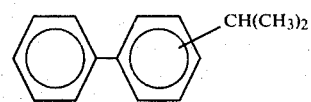

having formula $C_{15}H_{16}$ and a molecular weight of 196.3.

Monoisopropyl biphenyl is commercially available from Monsanto U.S., and others, as are various mixtures of mono di and other isopropyl biphenyls.

Other and higher dielectric constant fluids include the chlorobenzenes, chlorodiphenyl oxides, and the mixtures of esters and chlorinated aromatic compounds.

Impregnation of the capacitors of this invention may follow the usual practices associated with polypropylene film capacitors, for example, as disclosed and claimed in U.S. Pat. No. 3,363,156. It is preferred however, to utilize a lower temperature drying and evacuation process in the range of about 90°–110° C. and less than about 60 microns of Hg pressure, and a filling process where the capacitor is at 50°–80° C., and the fluid is at 40°–50° C. Subsequently, the capacitors are placed in an oven and their temperatures elevated into a range between about 60° C. and 100° C., and preferably between about 65° to 90° C. for as much as 40 hours.

The following examples are typical of the excellent results following the teachings of this invention. The capacitor space factor used were in the range of from about 5% to about 8%. Hazy film roughness varied from about 10% to 30% space factor of the polypropylene film only. The fluids used were PXE (Fluid A) which was purchased from Nippon Chemical Company as Nisseki Condenser Oil S and contained about 97% phenyl zylyl ethane with the balance a mixture of isomers, and MIPB (Fluid B) which was purchased from Tanatex Company as Sure-Sol 250. In each case the fluid was carefully refined to high purity and about 0.6–0.8% by weight of an epoxide such as ERL 4221 (commercially available from Union Carbide Company U.S.) and from about 0.01% to 0.10% by weight of an antioxidant material such as 2, 6-di-t-butyl-p-cresol were added thereto.

room temperature. This soaking was repeated a second time for an additional 20 hours. Thereafter the capacitors were brought to room temperature, sealed and given certain electrical tests.

DIV is discharge inception voltage also known as corona start voltage, and the values given are the averages of three readings. DEV is discharge extinction voltage, also known as corona extinction voltage. Dissipation factor is %DF or tan $\phi$ (loss angle) and is given as a watts loss percentage. The results show repetitive excellent capacitors as follows; albeit that the design and test criteria of these capacitors are inordinately severe.

| Diel. Thickness μ | Diel. Volts | Test Volts | μf Roll | DIV Av | DEV Av | DIV 250 Hrs | DEV 250 Hrs | DIV 1000 Hrs | DEV 1000 Hrs | T °C. |
|---|---|---|---|---|---|---|---|---|---|---|
| 35.0 | 1680 | | 7 μf | 3100 | 2600 | | | | | 25 |
| 35.0 | 1680 | | 7 μf | 3200 | 2500 | | | | | 25 |
| 35.0 | 1680 | | 7 μf | 3300 | 2600 | | | | | 25 |
| 35.0 | 1680 | | 7 μf | 3100 | 2500 | | | | | 25 |
| 43.0 | 1990 | | 4 μf | 3700 | 3000 | | | | | 25 |
| | | | | 3200 | 2700 | | | | | 80 |
| 43.0 | 1990 | | 4 μf | 3000 | 2400 | | | | | 25 |
| | | | | 3400 | 3100 | | | | | 80 |
| 43.0 | 1990 | | 4 μf | 3900 | 3000 | 3700 | 3300 | | | 25 |
| | | | | 4250 | 2200 | 3400 | 2700 | | | 80 |
| 43.0 | 1990 | | 4 μf | 3900 | 3200 | 3800 | 3500 | | | 25 |
| | | | | 5200 | 4300 | 3300 | 3000 | | | 80 |
| | 1990 | | 4 μf | 3600 | | 3000 | | 3200 | 3100 | 25 |
| | | | | 3600 | | 3100 | | 3000 | 2700 | 25 |
| | | | | 3700 | | 3100 | | 3600 | 3400 | 25 |
| | | | | 3500 | | 3000 | | 3800 | 3400 | 25 |

EXAMPLE I

A number of capacitors were assembled in accordance with the structure of FIGS. 3, 5 and 6 following the preferred practices set forth. The capacitor rolls were 10.62 inches (26.97 cm) in length and comprised patterned aluminum foil electrodes of about 0.22 mil (5.6 micron) thickness with 100 dimples per inch (2.54 cm) and two sheets of Hazy polypropylene film having about 10% to 30% space factor, one strip having a thickness of 0.70 mil (18 microns) and the other 1.0 mil (25.4 microns). Each capacitor was on the order of about 26 inches (66.0 cm) in height.

The assembled capacitors were oven dried at a temperature in the range of 85° C. to 100° C. and a vacuum of less than 60 microns Hg. for about 26 hours. The capacitors were then allowed to cool to the range from about 50° to 80° C., and the impregnating fluid at a temperature of about 40° to 50° C. was introduced into the capacitor under vacuum. After filling, the capacitors are placed in an oven and the temperature raised to from about 65° C. to 85° C. After stabilization at temperature, the capacitors were left to soak in the oven for about 20 hours after which temperature is reduced to As can be seen from the above data, these capacitors were subject to severe voltage stress and show very high and stable and repetitive DIV and DEV values. When the noted units were placed on rated voltage for life testing, a first retest occurred at 250 hours, indicating that no units had failed and no significant changes had occurred. Life testing was then continued for a total of 1000 hours, and a retesting occurred on representative units from each example. The DIV and DEV values remained satisfactory with an overall improvement. Dissipation factor and capacitance tests showed excellent values with dissipation factor improving with time, i.e., 120% of rated voltage for 1000 hours and being about 0.01% at 85° C.

EXAMPLE II

A further group of seven capacitors were made in accordance with the foregoing Example I, using a roll width of 22.5 inches (57.15 cm). The dielectric thickness was one sheet of 0.7 mil (18 micron) and one sheet of 1.0 mil (25.4 micron). These capacitors were rated 52 uf and 75 KVAR, with 1990 volts on the dielectric system across the foils. These capacitors were put on a life test at voltages ranging from 2350 to 3600 volts and temperatures ranging from room temperature to 70° C. All capacitors so tested survived in excess of 500 hours at the higher than rated voltages thus showing the improved capabilities of the dielectric system.

EXAMPLE III

Further groups of capacitors of various voltage ratings were made up in accordance with Example I and tested. Item #6 was a wide roll 22.5 inches (57.15 cm). The others were 11.25 inches (28.75 cm). The pad voltage, i.e., the voltage across the electrode foils ranged from 1800 to 1990 volts. The dielectric thickness between the electrode foils ranged from 1.5 mil thickness (38μ) to 1.7 mil thickness (43μ). The overall space factor for the total capacitor roll design was in the range of 20% to 30% before impregnation. The results show repetitiveness and certainty of the capacitors made in accordance with the present invention.

| # Units | KVAR | Volts (Rated) | DF 85° C. | Overvoltage 60 hrs 120% Rated V | | |
|---|---|---|---|---|---|---|
| | | | | Tested | Survived | Failed |
| 36 | 200 | 9960 | 021 | 36 | 36 | 0 |
| 48 | 200 | 14400 | 018 | 9 | 9 | 0 |
| 30 | 200 | 7620 | 021 | 9 | 9 | 0 |
| 30 | 200 | 7620 | 025 | 7 | 7 | 0 |
| 27 | 200 | 12470 | 015 | — | — | — |

EXAMPLE IV

Several capacitors were made up along the lines of those in Example I. The capacitors had rolls of 11.25 inches (28.75 cm) in length and 4 uf capacity. The capacitors were rated at 1990 volts across the foils. As per FIG. 8 one inside foil had each edge folded over for 0.375 inch (0.95 cm). Electrical tests on these capacitors indicate a marked increase in DIV and DEV values as compared to unfolded designs.

The use of the full dimple patterned foil of this invention and Hazy film facilitates, lends assurance to the impregnation of an all film capacitor and represents an improvement in the impregnation process. The use, in combination of Hazy film and patterned foil lends the requisite assurance and repetitiveness of the results and each supports and complements the other in areas where the other may be deficient. By this means the desirably high values of DEV, for example, are sustained.

The combination moderates the impregnation parameters which have become so severe for all film capacitors, and provides a structure widely adaptable to various impregnation processes including those of the manifold fill and flood fill kinds. Polypropylene film, as well as other synthetic resin films, may be easily produced with some degree of surface roughness less than or exceeding the preferred Hazy film of this invention, for example, less than about 5.0%. The pattern foil of this invention will provide its unique spacer results over the total range of surface roughness of the synthetic resin film from about 5.0% to greater than 30.0%. The space factors of the dimpled foil may be correlated with the space factors of the film in a higher to lower relationship or lower to higher, as the case may be. The preferred ranges are from about 5.0% to 30.0% space factor for the film, and a foil thickness of 2 to 20 times the original thickness. Examination of the full dimple pattern foil removed from assembled capacitors shows areas of minimum and few areas of maximum thickness indicating that the foil conforms to the available space and pressures where the spaces are due to haze variations, mismatched tolerances, or uneven winding.

While it is eminently desirably to use Hazy film in this invention because of the assuredness it lends to the space factor it provides, a satisfactory all film capacitor can be produced solely with the full dimple pattern foil of this invention, particularly the narrow width roll capacitors. However, there are instances where it would appear that either the patterned foil of this invention or the Hazy film will provide improved results. Their use together sometimes masks the contribution of one over the other, which, as before mentioned might be attributable to their complementary functions. The following Examples provide some indication of the individual contributions of patterned foil and Hazy film.

EXAMPLE V

In this example the capacitor construction and treatment were similar to those of Example I except that the capacitor rolls were of narrow design 10.62 inches wide (26.9 mm) and relatively smooth film, e.g., low space factor (LS) are included. High space factor Hazy film (HS) had an average space factor of about 20%. Capacitor space factor was about 5%. The voltage rating of the dielectric was moderate, i.e., about 1200 volts. DC is Direct Current, AC is Alternating Current, Vr is rated voltage. The capacitors were rated at 7960 volts and 200 KVAR.

| Film | DC 6.5 × Vr | AC 3 × Vr | 250 Hrs 6.25 × Vr | DC 6.25 × Vr |
|---|---|---|---|---|
| LS | 1/6 | 0/3 | 0/3 | ⅓ |
| HS | 3/6 | 0/3 | 0/3 | 0/3 |

EXAMPLE VI

In this example, duplicate sets of all polypropylene film capacitors were made up where only difference was one group included patterned foil and the other did not. Test results are as follows indicating that pattern foil provides superior results.

| Capacitor | Test Volts | T° C. | No. Tested | No. Failed | Time Hrs. |
|---|---|---|---|---|---|
| Plain foil | 660 AC | 80 | 18 | 4 | 1700 |
| Patterned Foil | 660 AC | 80 | 20 | 0 | 1700 |

One of the major reasons for the wide range of applicability of the full dimple pattern foil is the smoothness and cushioning effect of the dimple structure. Other projections or depressions formed by crimping, punching, knurling, or by sand blasted rolls cause sharp edge projections in the foil and many tears and punctures, all of which are highly disadvantageous in a high voltage highly stressed all film capacitor because of corona as described. The dimple or mound shape of the depressions and projections of the patterned foil of this invention utilize smooth flowing surfaces defining geometric ovate shapes which are extremely resistant to total deformation or crushing. These dimples project equidistantly from both sides of the plane of the foil and form a geometric or regular and repeating pattern of equidistantly spaced dimples and rows as illustrated. The pattern is continuous and coterminous with the active foil surface in a capacitor.

Preferably the dimpling process is carried out on the winding machine used to wind the capacitor rolls. The major advantage of this procedure is that it obviates the necessity of rewinding the patterned foil on a roll for subsequent winding into a capacitor roll. Such winding and rewinding exposes the dimples to potential damage, principally by crushing.

Referring now to FIG. 11, the dotted outline is that of a capacitor roll winding machine with a foil pattern apparatus 46 suitably attached. Apparatus 46 comprises a pair of embossing rolls 47 and 48 which are mounted for rotation on machine. Each roll surface is made of steel and is precision etched or engraved to provide mound-like projections thereon. In the alternative, either or both rolls may be of non metallic materials such as hardened plastics or rubbers. The roll surfaces, precisely assembled with appropriate adjustment devices, are brought into mating engagement with each other so that the projections of one roll interfit between projections on the mating roll. In cross section the roll projections defined mound like projections slightly in mesh with the same projections on the opposite roll. The rolls may be adjustable to vary their spaced apart distance to provide a dimple structure in the foil of about 0.0025 inches (about 63.5 microns) from the top of a dimple to the plane of the foil. The foil used is capacitor grade aluminum foil which is non contaminating and clean and which is soft annealed. A commercial USA designation is Grade 1143 which is 99.43% aluminum.

It is an important feature of this invention that the rolls 47 and 48 need not be driven by the winding machine. Rotational energy is derived from drawing the electrode foil 49 from a supply roll 50 and passing the foil 49 between the rolls when the foil is being would into the capacitor roll 51. This practice of using foil tension to drive embossing rolls lends consistency and uniformity to the dimples and the pattern.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. An electrical capacitor grade aluminum foil comprising a soft annealed aluminum foil strip having a plurality of individual curvilinear surfaced dimple-like projections and depressions from the plane of the foil, said projections and depressions being coterminous with the length and breadth of the useful foil surface in an electrical capacitor, said dimples being formed and spaced apart in a manner whereby there is a smooth essentially continuously curving foil surface leading from one dimple to an adjacent projection so that a point on the base of one dimple projection and a point on the adjacent base of a dimple depression are essentially coincident.

2. The foil of claim 1 wherein the dimples extend from the base foil centerline in a range of from about 0.0010 in. (2.54μ) to about 0.0050 in. (12.7μ).

3. The foil of claim 1 wherein the dimples are in a square grid and equidistantly spaced apart in regular rows which are of the same equidistant relationship with each other.

4. The invention as recited in claim 1 wherein said electrodes are aluminum and said embossed dimples are in the range of 0.00125 in (3.17μ) to 0.0037 (9.5μ) in height and whose bases are in the range of 0.01 in. (2.54μ) to 0.02 in. (5.08μ) in diameter.

5. The invention as recited in claim 4 wherein said dimples are placed on centers about 0.02 in. (5.08μ) apart on their X and Y axis.

6. The foil of claim 5 wherein the base size of a dimple is about 0.01 inches in diameter.

7. The foil of claim 5 wherein the dimples range from 100 to 120 per lineal inch (2.54 cm) of foil.

8. The invention as recited in claim 7 wherein one surface of said foil is a matte surface.

9. In an electrical capacitor including a casing with electrical terminals thereon and one or more capacitor rolls in said casing and connected to the terminals and a dielectric fluid in the casing and impregnating the roll, the combination of
    (a) said roll comprising a pair of spaced full dimple pattern metallic electrode foil strips and a dielectric therebetween consisting solely of a synthetic resin material and comprising at least one synthetic resin strip,
    (b) said electrode foil strips having raised closely spaced uniform dimples coterminously on the surfaces thereof to provide a compressible thickness electrode,
    (c) said dimples providing a foil thickness of between 2 and 10 times the original thickness before winding in said roll,
    (d) said dimples being formed and spaced apart in a manner whereby there is a smooth essentially continuously curving foil surface leading from one dimple to an adjacent dimple so that a point on the base of one dimple and a point on the base of an adjacent dimple are essentially coincident.

10. The invention as recited in claim 9 wherein said dimples extend from the base foil centerline in a range of from about 0.0010 in. (2.54μ) to about 0.0040 in. (10.0μ).

* * * * *

UNITED STATES PATENT AND TRADEMARK OFFICE
CERTIFICATE OF CORRECTION

PATENT NO. : 4,228,481
DATED : Oct. 14, 1980
INVENTOR(S) : Nicola G. DiNicola; Robert V. Pastir; William J. Wright It is certified that error appears in the above-identified patent and that said Letters Patent are hereby corrected as shown below:

IN THE SPECIFICATION

Column 4, Line 26, Change 0.0025 inches to 0.00025 inches.
Change 63.5 to 6.35 microns
Delete - Of the center line.

IN THE CLAIMS

Claim 2    Line 2 delete "centerline"
           Line 3 change 0.0010 to 0.00010
           Change .0050 to 0.00050

Claim 4    Line 3 change 0.00125 to 0.000125
           Change 0.0037 to 0.00037

Claim 10   Line 2 delete "centerline"
           Line 3 change 0.0010 to 0.00010
           Change 0.004 to 0.0004

Signed and Sealed this

Twenty-fourth Day of February 1981

[SEAL]

Attest:

RENE D. TEGTMEYER

Attesting Officer

Acting Commissioner of Patents and Trademarks